United States Patent
Sanami (10) Patent No.: US 8,031,944 B2
(45) Date of Patent: *Oct. 4, 2011

(54) IMAGE PROCESSING METHOD AND IMAGE PROCESSING APPARATUS

(75) Inventor: Hiroyuki Sanami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/899,968

(22) Filed: Oct. 7, 2010

(65) Prior Publication Data

US 2011/0058745 A1    Mar. 10, 2011

Related U.S. Application Data

(63) Continuation of application No. 11/675,114, filed on Feb. 15, 2007, now Pat. No. 7,831,095.

(30) Foreign Application Priority Data

Feb. 24, 2006   (JP) .................................. 2006-048980

(51) Int. Cl.
*G06K 9/34* (2006.01)
*G06K 9/48* (2006.01)
*G06K 9/66* (2006.01)

(52) U.S. Cl. ........ 382/190; 382/173; 382/199; 715/724; 715/725; 715/764; 715/770

(58) Field of Classification Search .................. 382/173, 382/190, 199; 715/724, 725, 764, 768, 770

See application file for complete search history.

(56) References Cited

U.S. PATENT DOCUMENTS

| | | | |
|---|---|---|---|
| 5,473,740 A * | 12/1995 | Kasson | 345/628 |
| 5,949,431 A | 9/1999 | Matsumura et al. | |
| 6,172,682 B1 * | 1/2001 | Claiborne et al. | 345/441 |
| 7,218,331 B2 * | 5/2007 | Huang et al. | 345/622 |
| 7,310,103 B2 * | 12/2007 | Patton | 345/620 |
| 7,340,097 B2 | 3/2008 | Kondo et al. | |
| 2004/0227772 A1 | 11/2004 | Huang et al. | |
| 2005/0104898 A1 | 5/2005 | Moffitt et al. | |
| 2005/0275663 A1 | 12/2005 | Kokojima et al. | |
| 2006/0115185 A1 | 6/2006 | Iida et al. | |
| 2009/0086275 A1 * | 4/2009 | Liang et al. | 358/3.21 |

FOREIGN PATENT DOCUMENTS

JP   06-282650   10/1994
JP   7-334675    12/1995

* cited by examiner

*Primary Examiner* — John Strege
(74) *Attorney, Agent, or Firm* — Fitzpatrick, Cella, Harper & Scinto (57) ABSTRACT

This invention relates to an image processing method and image processing apparatus capable of accurately cutting out a desired target from a displayed image. A polygonal area including a cutout target is specified from a displayed image. It is determined whether or not each side of the specified polygon contacts with the cutout target. A side that does not contact with the cutout target is selected as a side for starting cutout processing in accordance with the determination result. The pixel value is examined from the selected side in the inward direction of the polygonal area. It is determined whether or not the pixel belongs to the desired target. Finally, the desired target is cut out in accordance with the determination result.

6 Claims, 11 Drawing Sheets

IMAGE PROCESSING METHOD AND IMAGE PROCESSING APPARATUS

This is a continuation of U.S. patent application Ser. No. 11/675,114, filed Feb. 15, 2007, and allowed on Jul. 23, 2010 now U.S. Pat. No. 7,831,095.

BACKGROUND OF THE INVENTION

1. Field of the Invention

The present invention relates to an image processing method and image processing apparatus. Particularly, the present invention relates to an image processing method and image processing apparatus which allow a user to interactively cut out an image displayed on a screen.

2. Description of the Related Art

Image cutout processing is generally used in various stages of interactive image processing. To produce a printed product by laying out images, it is necessary to delete an undesirable background of each image to be laid out.

Various image cutout techniques have been proposed. For example, Japanese Patent Publication Laid-Open No. 7-334675 proposes a technique of scanning the periphery of a read and displayed image to determine background pixels and setting an area other than the background pixels as a cutout area.

Figure 9:
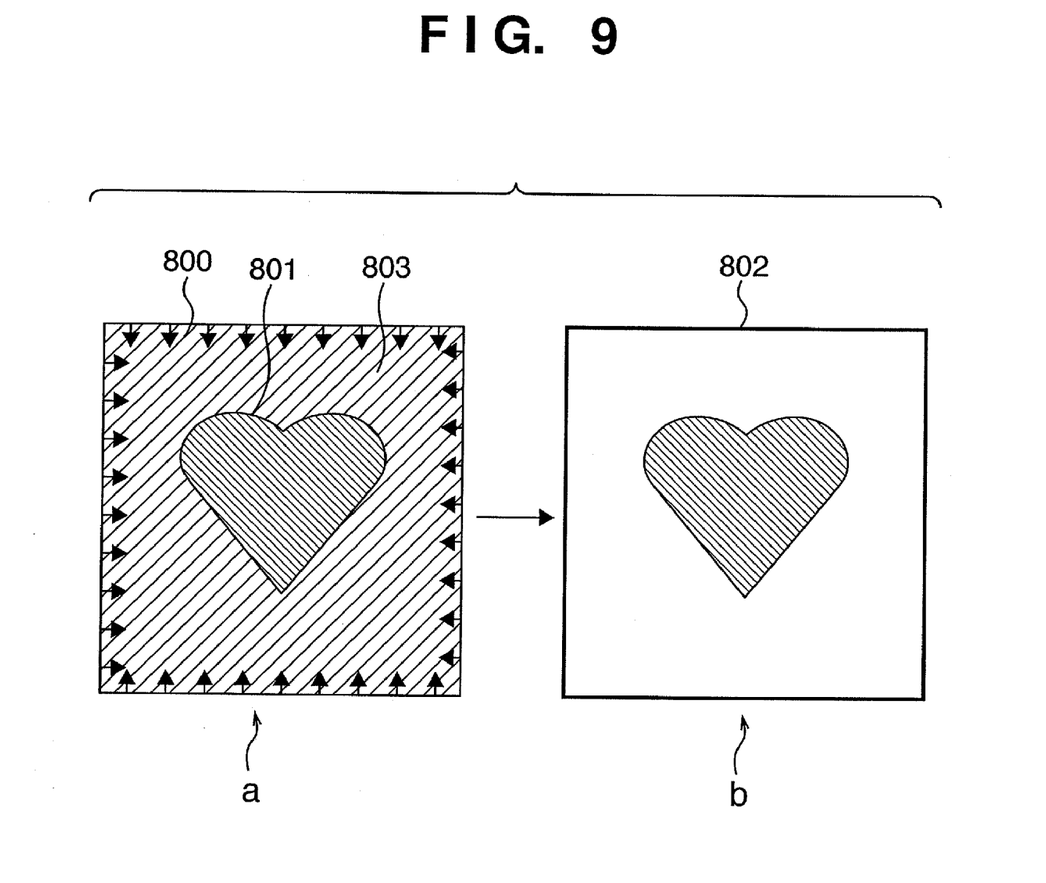
FIG. 9 is a view showing an example of conventional image cutout.

FIG. 9 is a view showing processing for cutting out a heart-shaped pattern from the background.

As shown in FIG. 9, in this cutout processing, an original image 800 is scanned from its four sides in directions indicated by arrows. A change in value from pixel to pixel is compared with a predetermined threshold value to check whether the pixel belongs to the background or the cutout target.

In image cutout processing, normally, if the original image 800 completely contains a cutout target 801, as shown in a of FIG. 9, it is possible to cut out the target area and delete a background part 803 without any problem so that an image 802 is obtained by cutout, as shown in b of FIG. 9.

However, the following problem arises in the prior art.

Figure 10:
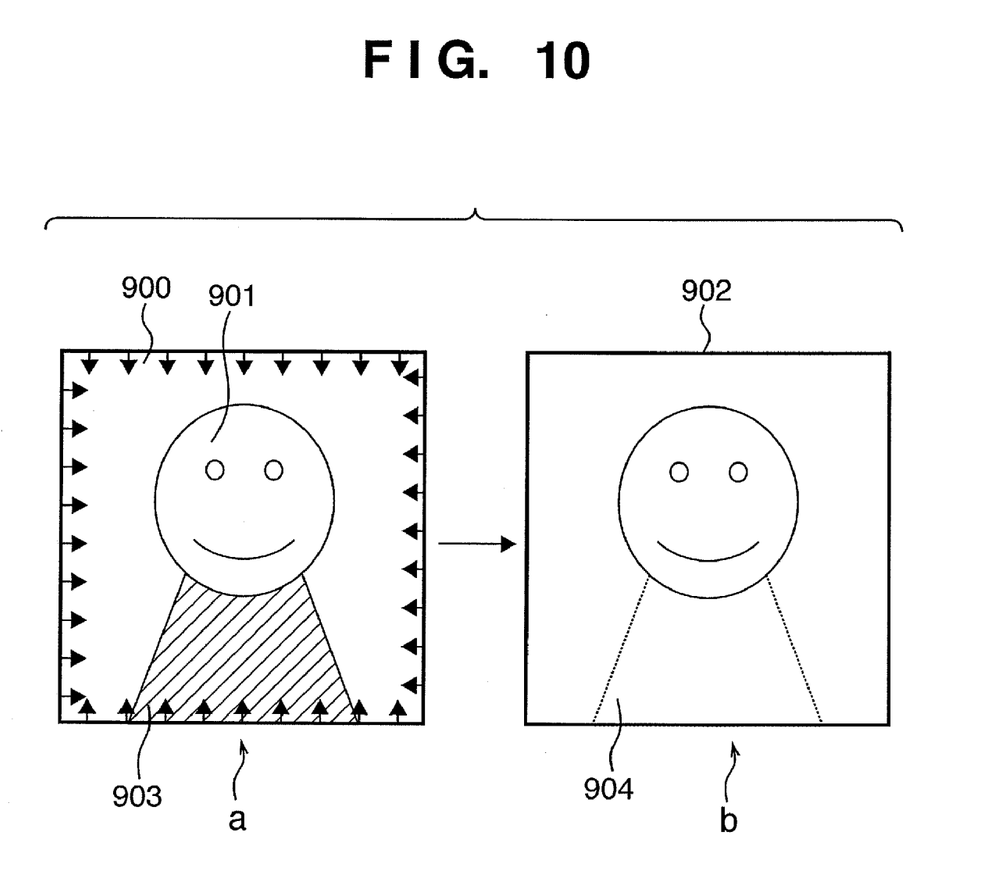
FIG. 10 is a view showing another example of conventional image cutout.

FIG. 10 is a view showing processing for cutting out a portrait as an object from the background.

Even when a portrait 901 with an upper body part from the chest up should be cut out from an original image 900 as shown in a of FIG. 10, scan is executed in the directions indicated by arrows to check a change in value from pixel to pixel from the four sides of the original image 900. In this case, a part 903 of the cutout target contacts with a window edge (lower side). This part is also contained in the scan target. In the prior art, the window edge is recognized as the background. For this reason, the part (the person's chest in this example) in contact with the window edge is recognized as the background color. Consequently, an image 902 obtained by cutout processing cannot accurately contain a chest part 904 of the object person, as shown in b of FIG. 10.

SUMMARY OF THE INVENTION

Accordingly, the present invention is conceived as a response to the above-described disadvantages of the conventional art.

For example, an image processing method and an apparatus using the method according to this invention are capable of accurately cutting out a desired target from a displayed image.

According to one aspect of the present invention, preferably, there is provided an image processing method of cutting out a cutout target from an image displayed on a screen, comprising: a display step of displaying an image on the screen; a specifying step of specifying an area including a cutout target from the image displayed in the display step; a first determination step of determining whether or not the area specified in the specifying step contacts with a circumference of the image; an instruction step of instructing to start cutout processing from a boundary line of a portion of the specified area that does not contact with the circumference of the image in accordance with a determination result in the first determination step; a second determination step of determining whether or not a pixel belongs to the cutout target by examining a value of the pixel from the boundary line instructed in the instruction step and moving in an inward direction of the specified area; and a cutout step of cutting out the cutout target in accordance with a determination result in the second determination step.

According to another aspect of the present invention, preferably, there is provided a computer program which executes each step recited in the above method in a computer.

According to still another aspect of the present invention, preferably, there is provided an image processing apparatus which executes the above computer program, comprising: a display which displays an image; a storage device in which the computer program is installed; a CPU which executes the computer program; instruction means for causing a user to input an instruction to the image processing apparatus; and input means for inputting image data representing the image.

The invention is particularly advantageous since, from among the boundary lines of the area surrounding the cutout target, a boundary line that does not contact the cutout target is used as a line to start image cutout. This allows cut out of an image on the basis of the values of pixels contained in the background image separated from the cutout target. It is therefore possible to obtain a more satisfactory cutout result.

Hence, even in a case where the cutout target contacts with the edge of the display window, satisfactory image cutout is possible.

Further features of the present invention will become apparent from the following description of exemplary embodiments (with reference to the attached drawings).

DESCRIPTION OF THE EMBODIMENTS

Preferred embodiments of the present invention will now be described in detail in accordance with the accompanying drawings.

Figure 1:
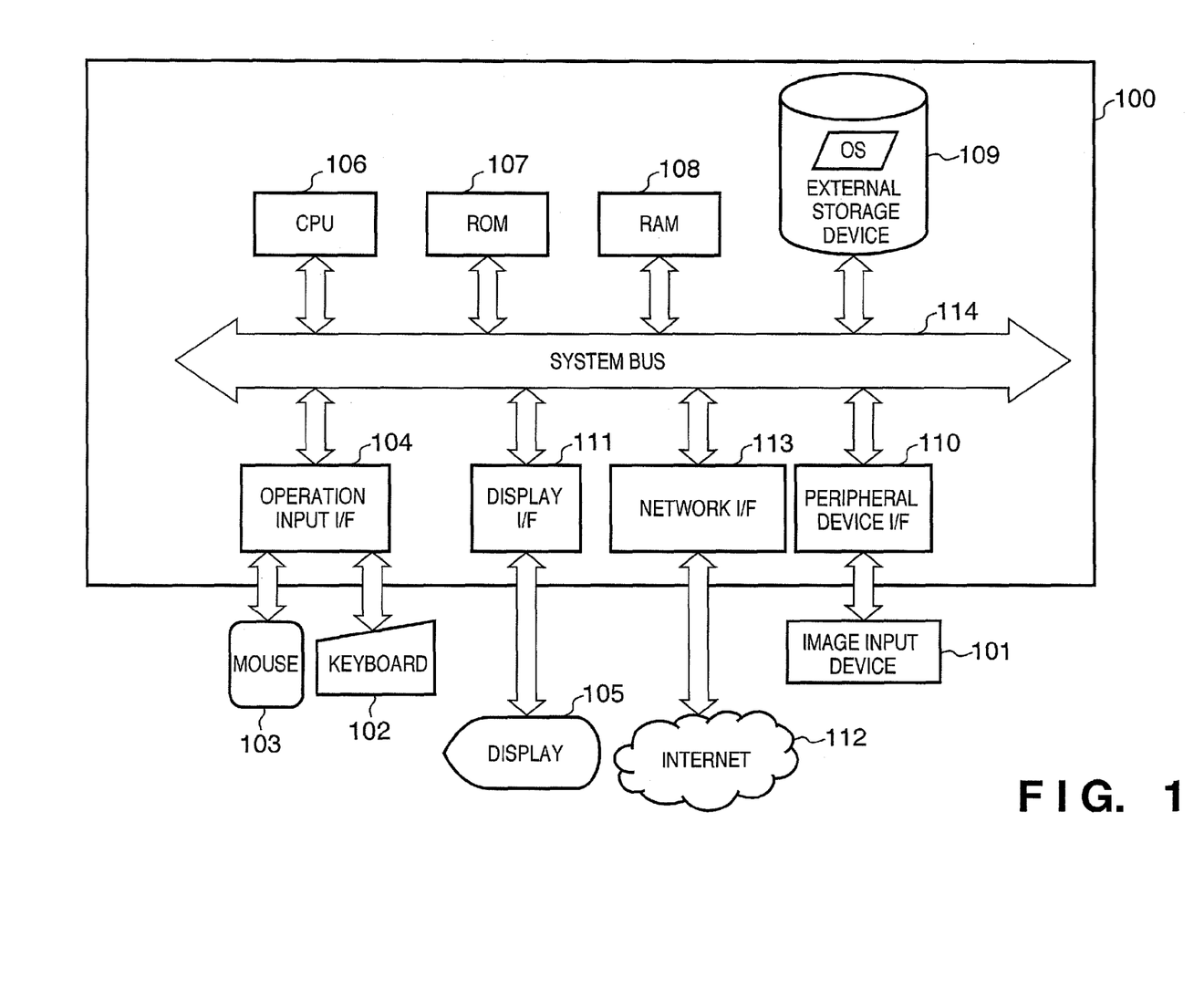
FIG. 1 is a block diagram showing the arrangement of a personal computer that performs an image processing method according to a typical embodiment of the present invention.

FIG. 1 is a block diagram showing the arrangement of a personal computer (PC) that performs image cutout processing according to a typical embodiment of the present invention.

Any information processing apparatus other than the PC shown in FIG. 1 can perform the image cutout processing according to this embodiment if it fundamentally has the same arrangement as the PC. In addition to a stand-alone PC, a plurality of computers connected via a network to distribute functions or a portable computer is usable.

As shown in FIG. 1, a PC 100 is connected to an image input device 101 that reads an image as digital data, and a keyboard 102 and Mouse® 103 provided to man-machine-interactively perform image cutout processing. A user can input an instruction of, e.g., image processing or window manipulation to the PC 100 by using the keyboard 102 and Mouse® 103. The PC 100 is also connected to a display 105 such as an LCD that displays various kinds of information and images. The display 105 may be of an integrated type that is incorporated in the main body of the PC 100.

The image input device 101 includes at least one of a DVD drive, CD drive, scanner, digital camera, PC card, flexible disk, magneto-optical (MO) disk drive, ZIP Drive®, and file system. The image input device 101 is connected to the PC 100 via a peripheral device interface (I/F) 110.

Not only the image input device but also a printer (not shown) can also be connected to the peripheral device interface (I/F). The printer receives image data and prints an image. In this embodiment, a USB is employed as the peripheral device interface. However, an interface conforming to another specification is also usable.

The PC 100 includes a CPU 106 that controls the entire machine, a ROM 107 that stores programs and parameters requiring no change, a RAM 108 that temporarily stores programs and data supplied from an external device, and an external storage device 109. The external storage device 109 may be a fixed medium such as a hard disk or a nonvolatile memory card with a mass storage volume. The external storage device 109 may also be a removable medium such as a flexible disk (FD) or a compact disk (CD). Other examples of the removable medium may be a magnetic card, optical card, IC card, and memory card.

The PC 100 comprises an operation input interface (I/F) 104 to connect the keyboard 102 and Mouse® 103, and a display I/F 111 to connect the display 105. The PC 100 also comprises a network I/F 113 to connect Internet 112. The PC 100 can also be connected to a LAN or another network via the network I/F 113.

These constituent elements connect to each other via a system bus 114.

The RAM 108 temporarily saves image data, image information, and calculation results during the operation.

Not only an operating system (OS) to operate the PC 100 but also a printer driver to operate a printer and an application program (to be referred to as an application hereinafter) to execute image cutout processing to be described below are installed in the external storage device 109.

Some embodiments of image cutout processing executed by the PC with the above-described arrangement will be described next.

This image cutout processing is executed when the user activates the application.

First Embodiment

Figure 2:
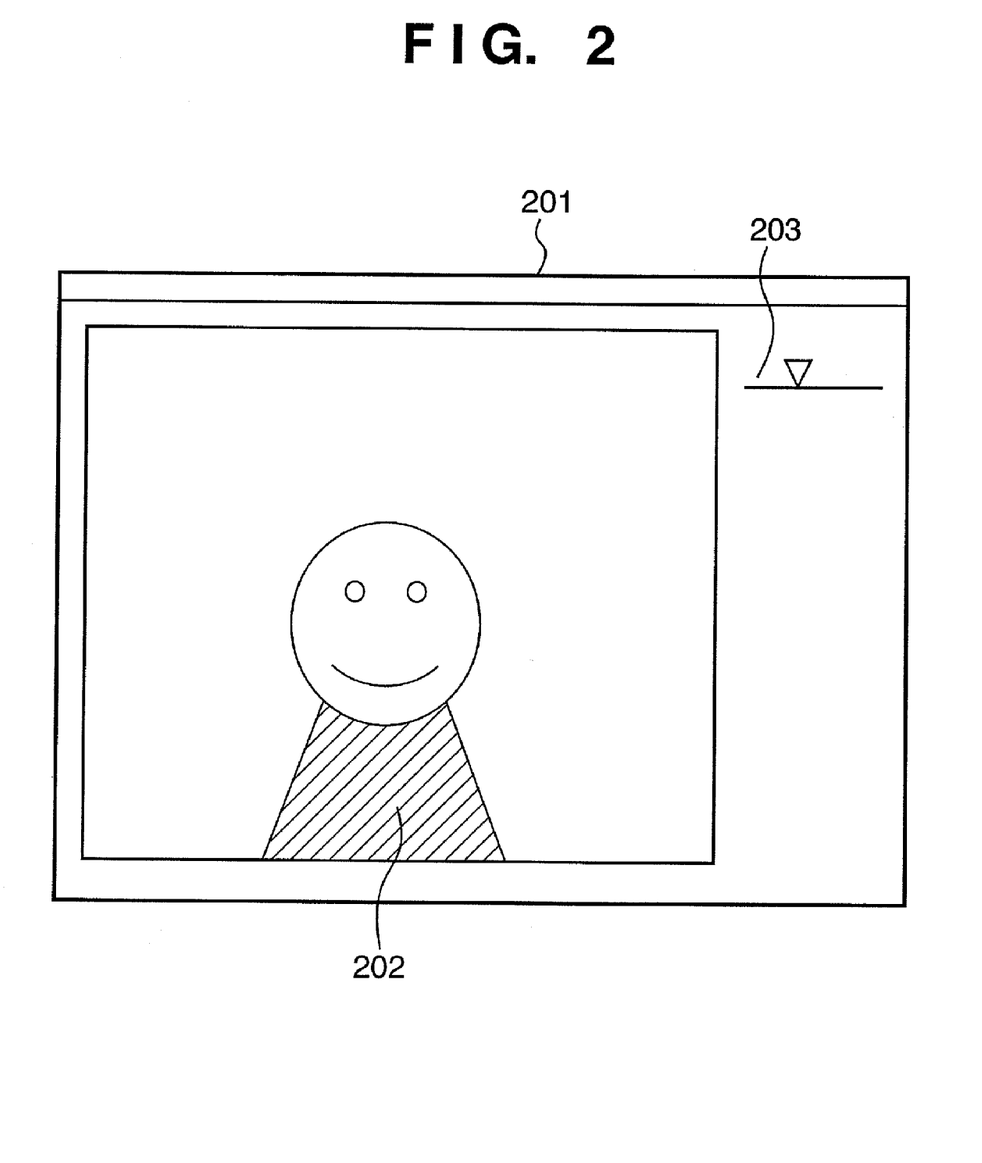
FIG. 2 is a view showing an example of the display window of an application executed by the personal computer shown in FIG. 1.

FIG. 2 is a view showing an example of a window displayed on a display screen by an application to execute image cutout processing.

Referring to FIG. 2, reference numeral 201 denotes a display screen; 202, a cutout target image; and 203, a threshold slide bar. The user sets a threshold value (to be described below) for image cutout by manipulating the threshold slide bar 203 with the keyboard 102 or Mouse® 103.

An example will be described in which a portrait with an upper body part from the chest up is set as the cutout target 202. This image is the same as that described in the prior art shown in FIG. 10.

Figure 3:
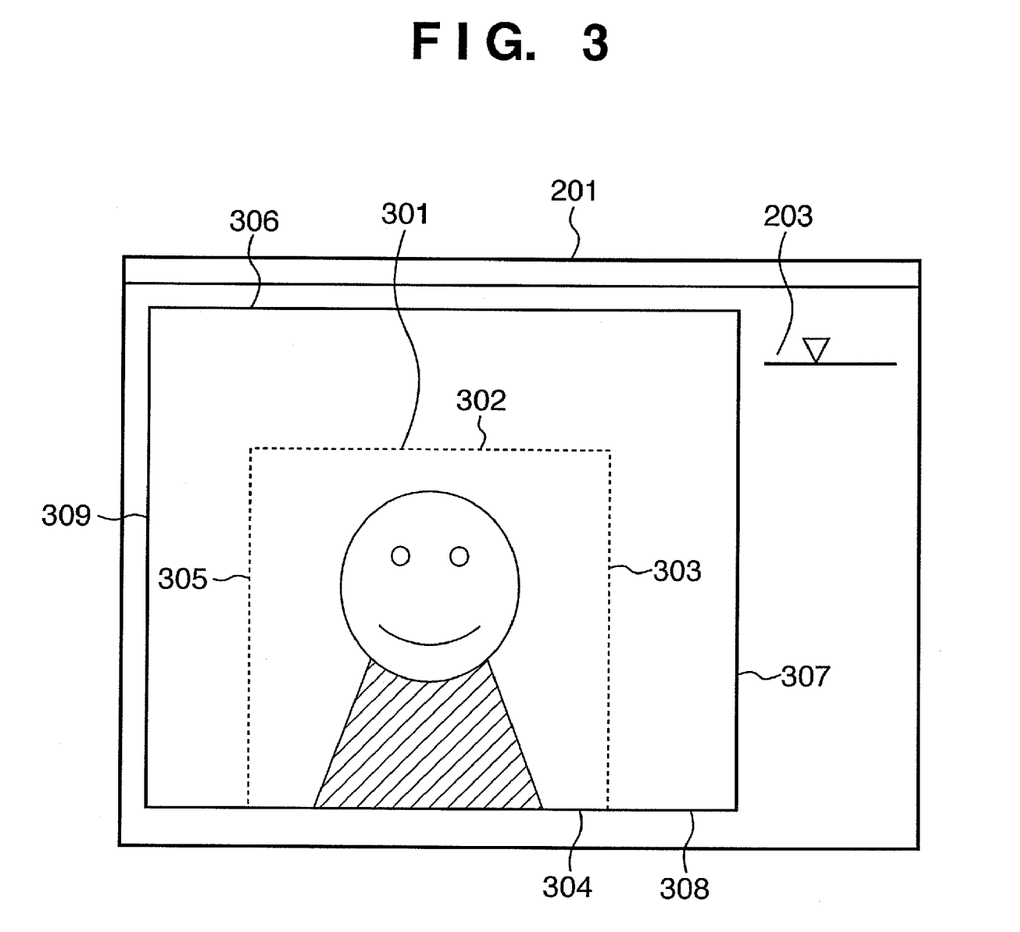
FIG. 3 is a view showing a window to select a rectangle for image cutout.

FIG. 3 is a view showing a window to select a rectangle for image cutout.

Referring to FIG. 3, a selection rectangle 301 is indicated by a dotted line. Reference numerals 302 to 305 denote sides of the selection rectangle 301.

Figure 4:
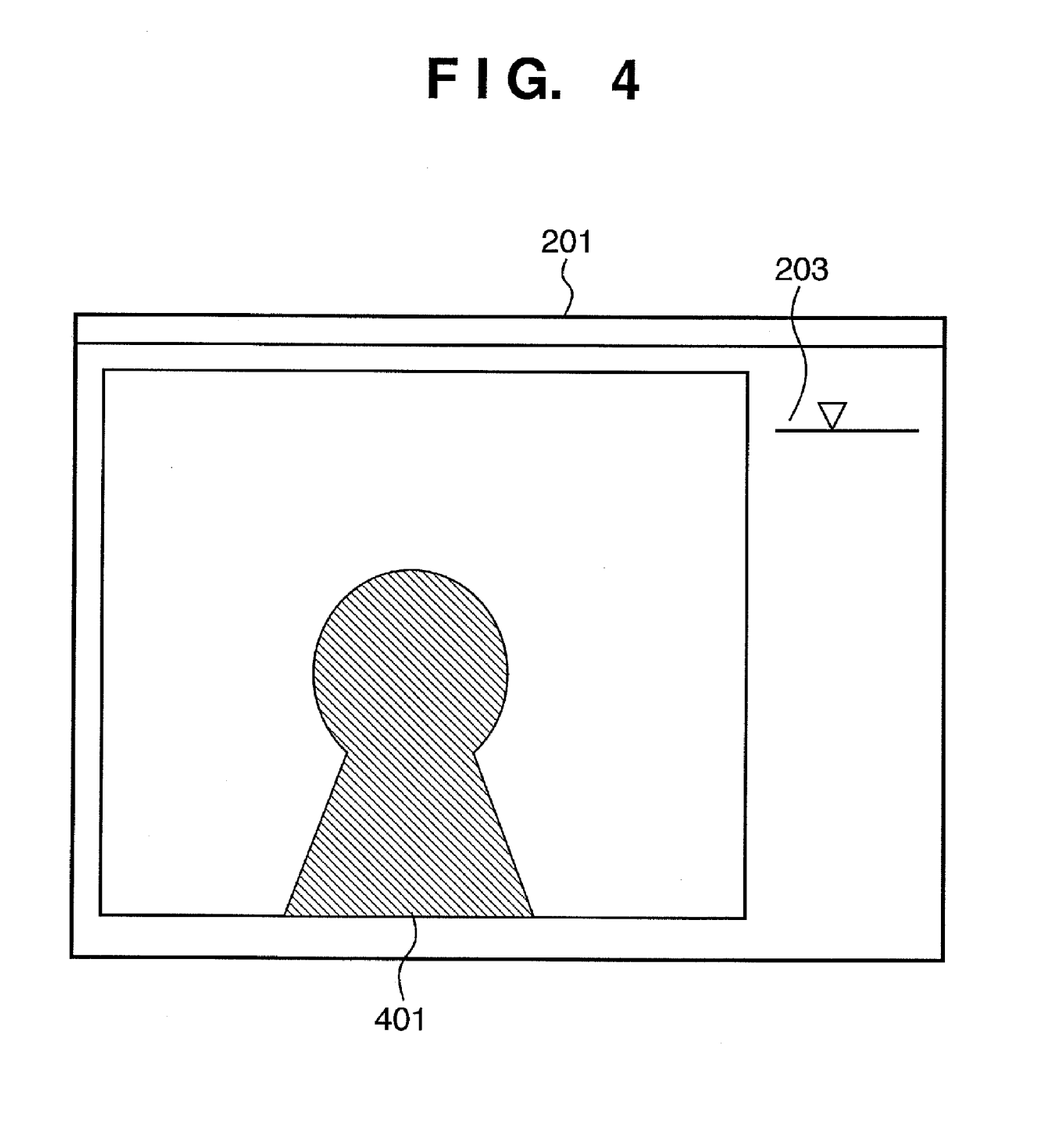
FIG. 4 is a view showing a window with an image cutout result.

FIG. 4 is a view showing a window with an image cutout result.

Referring to FIG. 4, reference numeral 401 denotes a cutout area, of the object, which is filled in. Note that the cutout area 401 is shown as a shaded area in FIG. 4.

Figure 5:
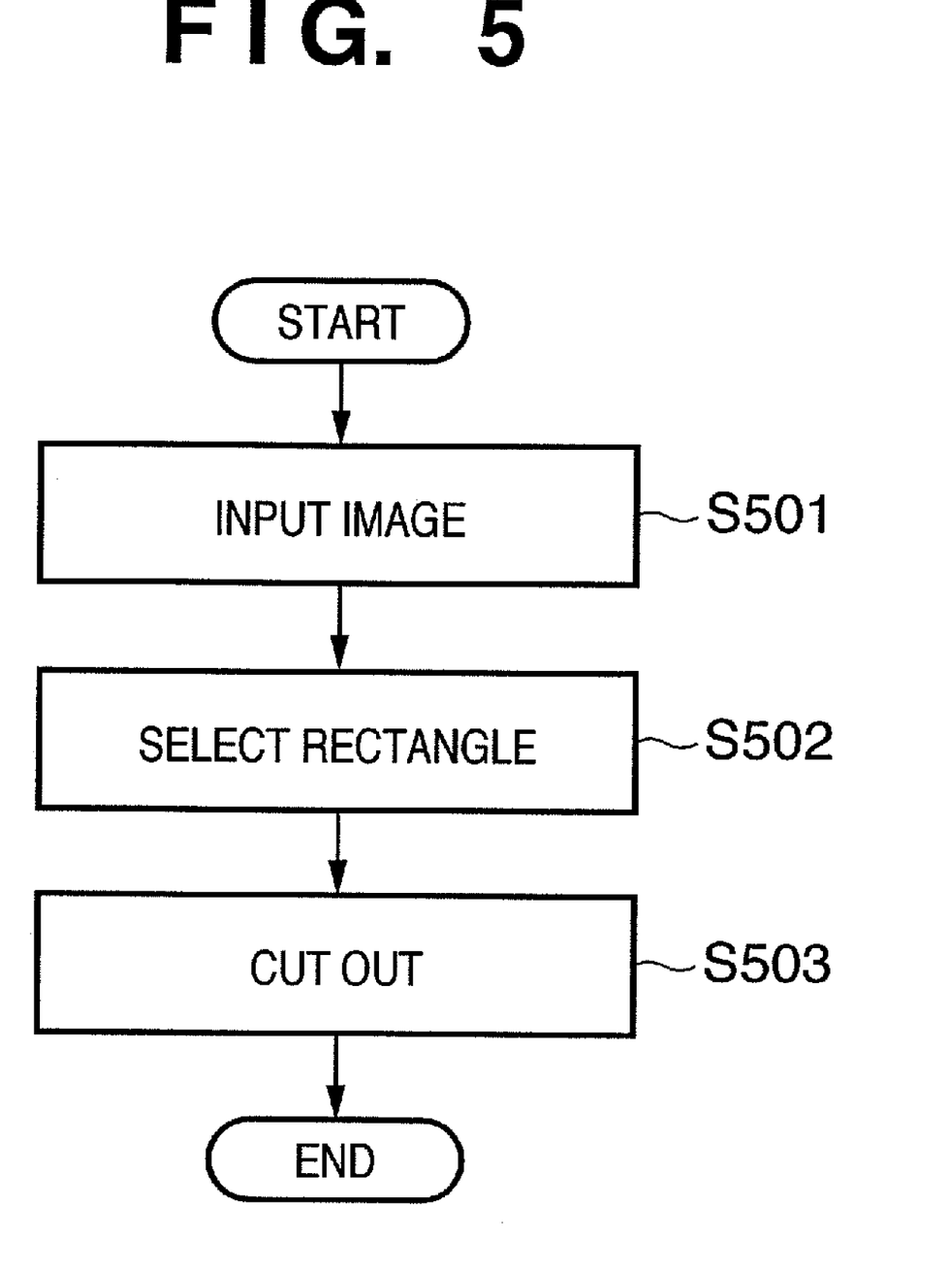
FIG. 5 is a flowchart showing the outline of image cutout processing.
Figure 6:
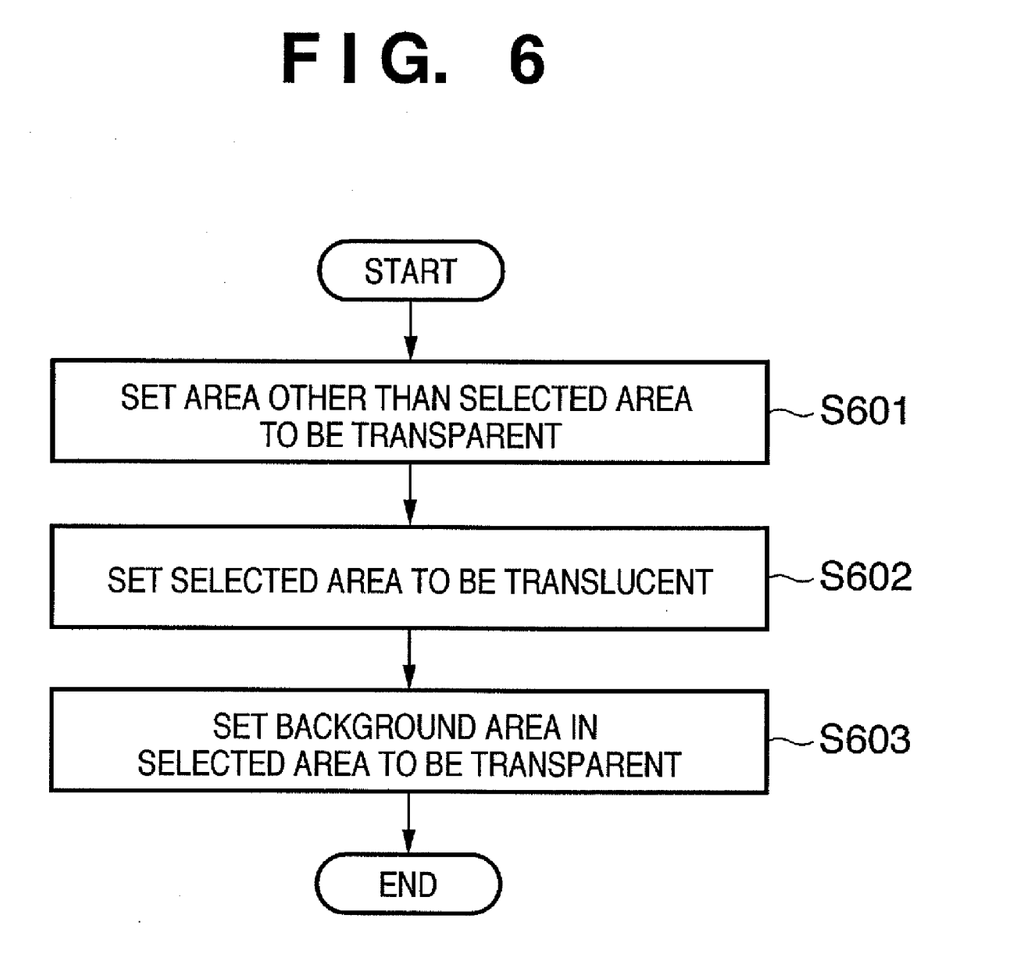
FIG. 6 is a flowchart showing a detailed procedure of image cutout processing.

Details of image cutout processing will be described next with reference to the flowcharts in FIGS. 5 to 7.

When the application to execute image cutout processing is activated, a cutout target image is loaded from the image input device 101 or external storage device 109 in step S501. After loading, the display 105 displays an image as shown in FIG. 2 on the screen 201.

In step S502, the user sets a selected rectangle that surrounds the entire object to be cut out from the displayed image by dragging the Mouse® 103, as shown in FIG. 3.

In step S503, the image is cut out on the basis of the information of the selected rectangle. Details of this cutout processing will be described with reference to the flowchart in FIG. 6.

In step S601, the area outside the selected area is set to be transparent. The area other than the selected rectangle 301 in FIG. 3 is deleted. In step S602, the entire selected area is set to be translucent and initialized. In step S603, the background area is deleted from the translucent area. Details of this background area deletion processing will be described with reference to the flowchart in FIG. 7.

In step S701, out of the sides of the selected rectangle 301 set in step S502, the upper side 302 is set as the initial line segment. In step S702, it is checked whether or not line segment setting is ended. If setting is ended, the process advances to step S706. If setting continues, the process advances to step S703.

In step S703, it is checked whether or not the line segment is inscribed in the cutout target image. The user determines this interactively by observing the display screen. If it is determined that the line segment is inscribed in the cutout target image, use of the line segment for image cutout processing is inhibited, and the process advances to step S705. If it is determined that the line segment is not inscribed in the cutout target image, the process advances to step S704. In step S704, the line segment information is added to a line segment list to be used for processing to utilize this side for image cutout processing. Then, the process advances to step S705.

In step S705, the examination moves to the next line segment. For example, the right side 303 is examined next to the upper side 302.

With the process in steps S702 to S705, the upper side 302, right side 303, and left side 305 are added to the list in the example shown in FIG. 3.

Image cutout processing starts for the line segments added to the list.

In step S706, the upper side 302 is set as the initial line segment. In step S707, it is checked whether or not all line segments contained in the list have been ended. If it is determined that the process has been ended, the process is ended. If the process continues, the process advances to step S708. In step S708, the starting point of the line segment is selected as an initial pixel of interest. For example, the left end of the upper side 302 is set as the initial pixel of interest.

In step S709, it is checked whether or not all pixels of the line segment have been processed. If it is determined that the process has been ended, the process advances to step 713. If the process has not been ended yet, the process advances to step S710.

In step S710, it is checked whether or not the pixel of interest as the process target has already been selected as the background area. Scan for image cutout is performed from a plurality of directions, and it is checked a plurality of number of times whether or not each pixel in the selected rectangle area belongs to the background. Since a pixel may already be selected as the background for the above repeated processes, the process in step S710 is executed. If it is determined that the pixel of interest has already been selected, the process advances to step S712. If it is determined that the pixel of interest has not been selected yet, the process advances to step S711.

In step S711, it is determined whether the pixel belongs to the background area or cutout target. The pixel value of the current process target pixel is compared with that of the preceding pixel. The determination in step S711 is made on the basis of the comparison result. If the difference is equal to or larger than a predetermined threshold value, it is determined that the pixel values exhibit discontinuity, and the current process target pixel belongs to the cutout target image. To the contrary, if the difference is smaller than the threshold value, the pixel value does not largely change. That is, it is determined that since a uniform color still continues, the current process target pixel belongs to the background image.

Note that the user can change the predetermined threshold value by using the threshold slide bar 203 displayed on the screen.

In this embodiment, it is assumed that image data is expressed by RGB components. The above-described determination is made by obtaining the difference in each color component between two continuous pixels.

In step S712, the pixel next to the current process target pixel on the line segment is set as the next pixel of interest. Then, the process returns to step S709. Determination on all points (pixels) on the current line segment are made by repeating the process in steps S709 to S712.

When all points (pixels) on the current line segment have been processed, the process target moves to the next line segment in step S713. For example, if the upper side 302 is the initial line segment of image cutout, a line segment immediately under it is set as the process target.

In this way, the line segments from the upper side 302 to the line immediately above the lower side 304 are processed. Then, the downward process from the upper side 302 is complete.

The list also includes the right side 303 and left side 305 as the line segments to be used for image cutout processing. The right side 303 is set as the initial line segment. The same cutout processing as described above is executed from the right side to the left side of the selected rectangle 301. After that, the left side 305 is set as the initial line segment. The same cutout processing as described above is executed from the left side to the right side of the selected rectangle 301.

The image cutout processing is executed from the three sides in the above-described way.

In the above-described example, all pixels contained in the selected rectangle 301 other than the lower side 304 undergo the process of determining whether they belong to the background image or cutout target image a total of three times from the three sides. However, instead of determining for all pixels, the determination may be made for every few pixels or every few lines in consideration of the PC throughput (CPU capability, memory capacity, and bus speed) or the amount of processed image data. This increases the process speed although the image cutout accuracy decreases.

In this case, in, e.g., step S712, not the pixel next to the current process target pixel on the line segment but a pixel away from the current process target pixel by few pixels on the line segment is set as the next pixel of interest. The same determination result as in step S711 is adopted for the few pixels for which the process is skipped. In step S713, not the next line segment but a line segment away from the current process line segment by few lines is set as the next process target. The same determination result as that of the just processed line is adopted for the few lines for which the process is skipped.

Figure 8:
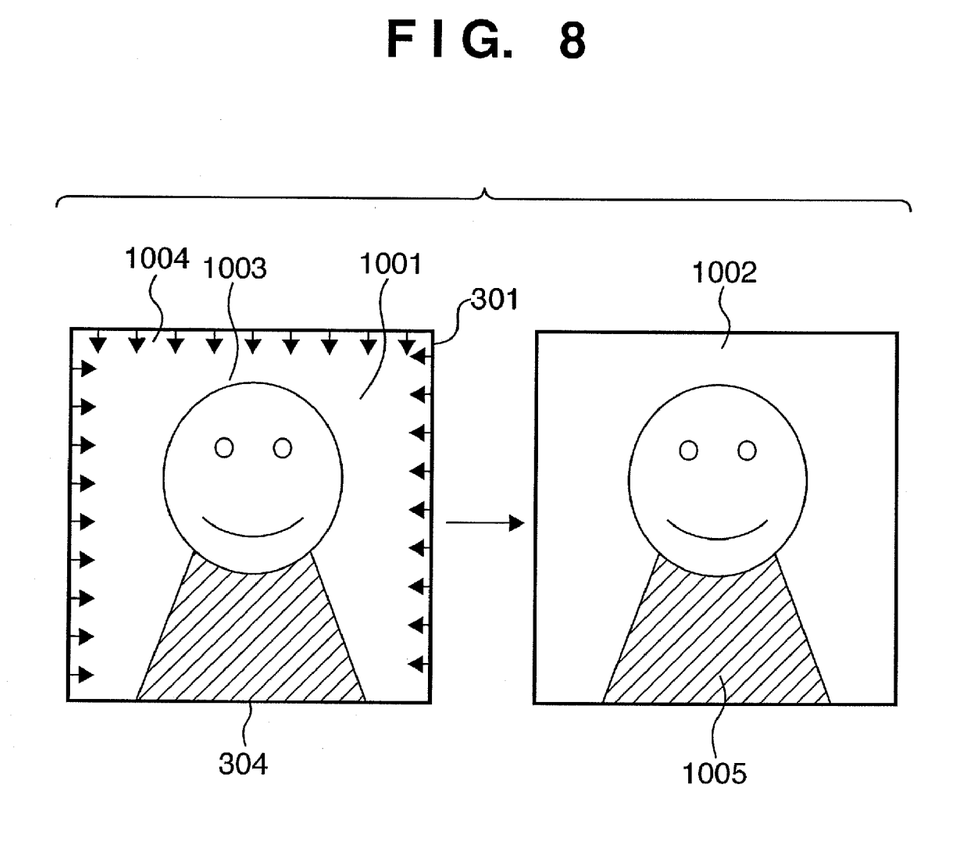
FIG. 8 is a view showing an example of image cutout processing according to an embodiment of the present invention.

FIG. 8 is a view showing images before and after image cutout processing.

Referring to FIG. 8, reference numeral 1001 denotes an image before image cutout processing; 1002, an image after image cutout processing; 1003, a portrait as a cutout target image; 1004, arrows indicating target points of image cutout processing; and 1005, a chest part (clothes part) of the image of the image cutout processing result.

As shown in FIG. 8, as the result of image cutout processing, the lower side 304 where the selected rectangle 301 contacts with the window edge is excluded from the cutout processing target. As a result, the clothes part 1005 still remains in the image 1002.

According to the above-described embodiment, it is possible to accurately cut out even an image inscribed in a window edge.

Second Embodiment

Another embodiment of image cutout processing will be described.

Figure 7:
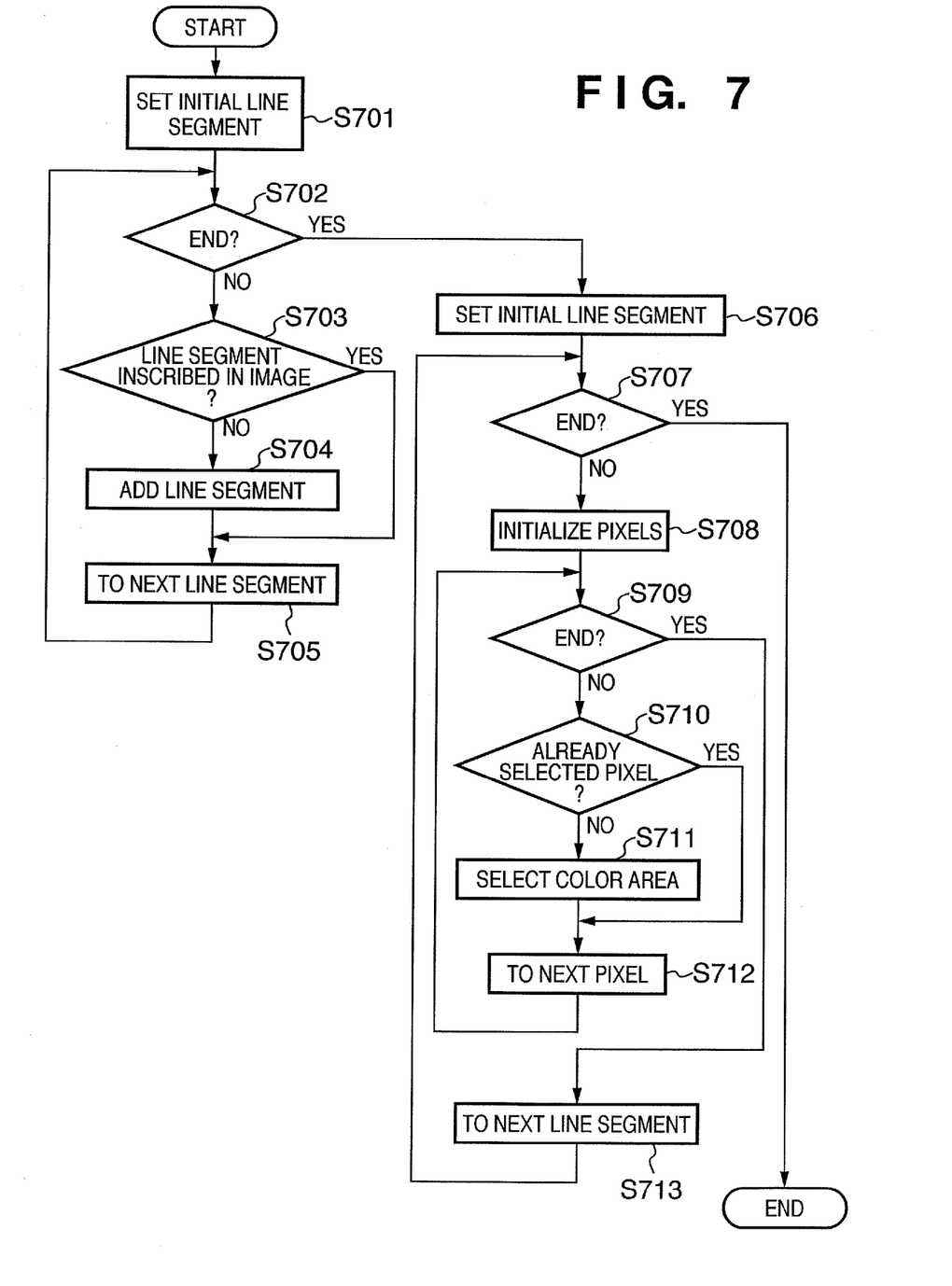
FIG. 7 is a flowchart showing a detailed procedure of background area selection processing.

The fundamental procedure of the processing according to this embodiment is the same as in the flowchart shown in FIG. 7 described in the first embodiment. A description will be made below with reference to the same step numbers as in FIG. 7. A description of the same process as in the first embodiment will be omitted, and only a characteristic part of the second embodiment will be explained.

The first difference between the first embodiment and the second embodiment is the line segment selection method in step S703.

In the first embodiment, the user selects a line segment. In the second embodiment, however, a line segment is automatically selected. The auto selection is performed in the following way.

First, it is determined whether the distance between each of the sides (i.e., line segments 302 to 305) of a rectangular area 301 designated by the user in FIG. 3 and the corresponding circumference (sides 306 to 309) of the entire image is equal to or smaller than a predetermined value (predetermined number of pixels).

If it is determined that the distance is equal to or smaller than the predetermined value, the line segment is determined to be inscribed in the cutout target image. Use of the line segment for image cutout processing is inhibited. That is, the process jumps to step S705 without executing step S704.

If it is determined that the distance is larger than the predetermined value (if the distance is more than the predetermined number of pixels), the line segment is determined not to be inscribed in the cutout target image. The process advances to step S704 to add the line segment to the line segment list to be used for image cutout processing. Alternatively, if the distance is larger than the predetermined value, the user may be queried about whether or not the line segment is inscribed in the cutout target image, as in the first embodiment. If it is determined that the line segment is not inscribed, the line segment is added to the line segment list. If it is determined that the line segment is inscribed, addition to the line segment list is inhibited.

In the second embodiment, a line segment is automatically selected.

The second difference between the first embodiment and the second embodiment is the process in steps S706 to S713.

In step S706, the upper side 302 is set as the initial line segment.

In step S707, it is checked whether or not all line segments contained in the list have been processed. If it is determined that the process has been ended, the process is ended. If the process still continues, the process advances to step S708.

Figure 11:
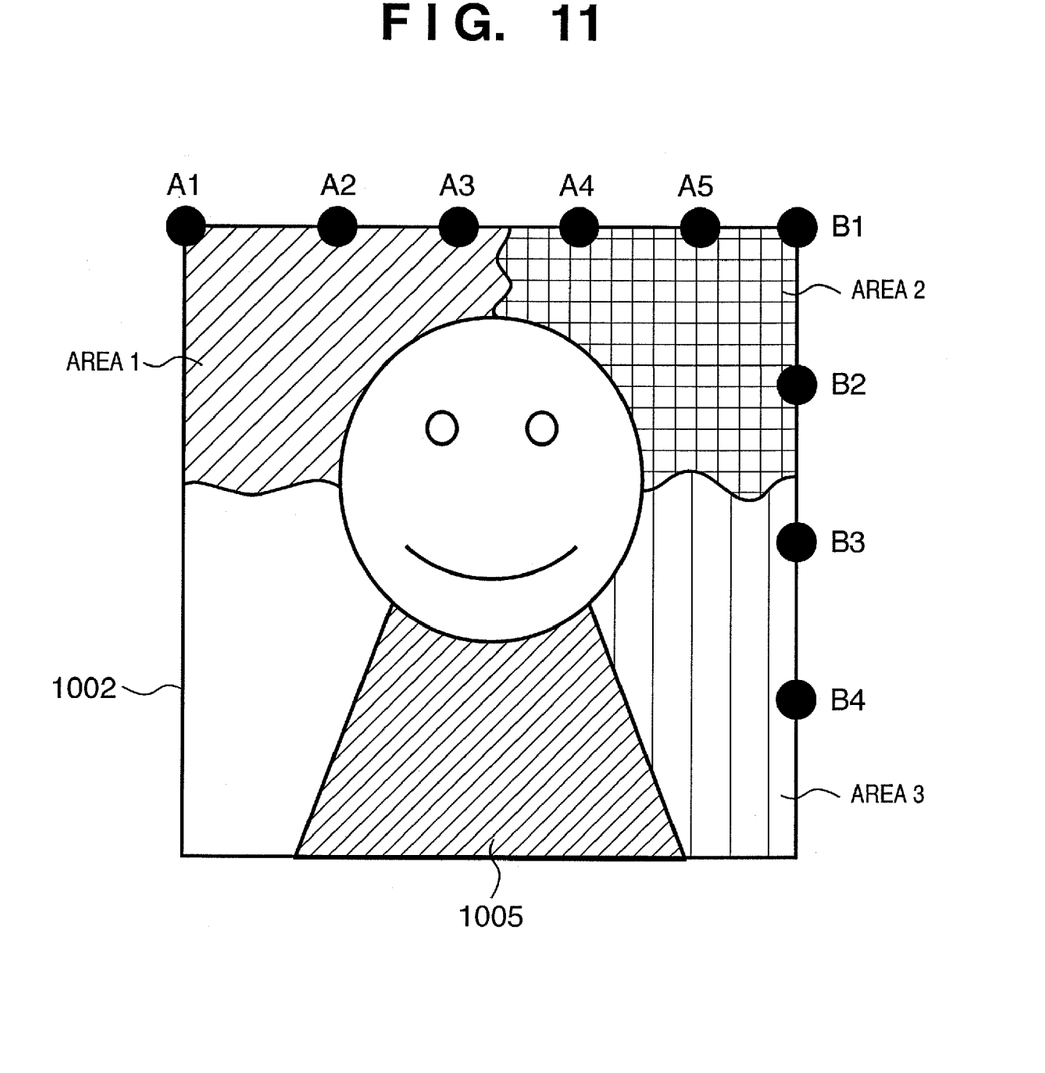
FIG. 11 is a view showing an example of a display window according to the second embodiment in which pixels of interest are set.

FIG. 11 is a view showing an example of a display window in which pixels of interest are selected.

Referring to FIG. 11, A1 to A5 indicate pixels of interest of the upper side, and B1 to B4 indicate pixels of interest of the right side. AREA1 is a background image area near the pixels A1 to A3 of interest. AREA2 is a background image area near the pixels A4, A5, B1, and B2 of interest. AREA3 is a background image area near the pixels B3 and B4 of interest.

In step S708, pixels of interest are set at a predetermined interval (every predetermined number of pixels), as shown in FIG. 11. The starting point is selected as the initial pixel of interest. For example, the left end of the upper side 302 is set as the initial pixel of interest. In the right side 303, the initial pixel of interest is the upper end. In the lower side 304, the initial pixel of interest is the right end. In the left side 305, the initial pixel of interest is the lower end.

In step S709, it is checked whether or not all pixels of the line segment have been processed. If it is determined that the process has been ended, the process advances to step 713. If the process has not been ended yet, the process advances to step S710.

In step S710, it is checked whether or not the pixel of interest as the process target has been already selected as the background area. This process is executed because the pixel of interest may already be selected as the background in the color area selection process in step S711 to be described later. If it is determined that the pixel of interest has been already selected, the process advances to step S712. If it is determined that the pixel of interest has not been selected yet, the process advances to step S711.

In step S711, it is determined whether the pixel belongs to the background area (color area in FIG. 7) or cutout target. More specifically, an area where the current pixel of interest exists and pixels with colors similar to the current pixel of interest continue is selected as the background area.

This selection is made in the following way.

The pixel value of the current pixel of interest is compared with the pixel values of all pixels in the area 301 selected by the user. If the difference from the pixel value of the current pixel of interest is equal to or larger than a predetermined threshold value, it is determined that the values of the pixel and current pixel of interest exhibit discontinuity, and the pixel is not a background candidate pixel. To the contrary, if the difference is smaller than the threshold value, the pixel value does not largely change from that of the pixel of interest. It is determined that the pixel is a background candidate pixel. It is determined that of the area including the background candidate pixels, an area of continuous pixels including the pixel of interest is a background area.

Every time step S711 is executed, a background area is added to increase the background areas. In FIG. 11, when a background area is selected on the basis of the pixel A1 of interest, it is determined that the hatched area AREA1 is the background area. The pixels A2 and A3 are included in the background area and therefore determined in step S710 to be already selected pixels of interest. The pixel A4 of interest is set as the next pixel of interest. The checkered area AREA2 is selected as the background area based on the pixel A4 of interest. The pixel A5 of interest is included in the area AREA2. For this reason, in a case where the upper side 302 is set as the process target line segment, a combined area of the areas AREA1 and AREA2 is selected as the background, and the process is ended.

Note that the user can change the predetermined threshold value by using a threshold slide bar 203 displayed on the screen.

In this embodiment, image data is expressed by RGB components. The above-described determination is made by obtaining the difference in each color component between two continuous pixels.

In step S712, the next pixel of interest on the current process target line segment is set as the current pixel of interest. Then, the process returns to step S709. A determination based on all pixels of interest on the current line segment is made by repeating the process in steps S709 to S712.

When the process based on all pixels of interest on the current line segment is ended, the process target moves to the next line segment in step S713.

For example, if the upper side 302 is the initial line segment of image cutout, the next line segment is set clockwise so that the line segment of the right side 303 is set as the process target. Every time the process in step S713 is executed, the next line segment is set clockwise to continue the process.

According to the example shown in FIG. 11, when the upper side 302 is set as the process target line segment, a part obtained by adding the area AREA1 and area AREA2 is selected as the background. Hence, when the right side 303 is set as the process target line segment, the pixels B1 and B2 of interest which are already included in the selected background are determined as already selected pixels of interest in step S710 so step S711 is not executed.

When the pixel B3 of interest is set as the current pixel of interest, background area selection in step S711 is executed. The striped area AREA3 is selected as the background area, and consequently, a part obtained by adding the area AREA1 area AREA2, and area AREA3 is selected as the background image. The background image is selected by repeating this processing.

Hence, even according to the above-described embodiment, it is possible to accurately cut out an image inscribed in a window edge.

In the above-described embodiment, an image is cut out on the basis of a selected rectangle. However, the present invention is not limited to this. For example, the user may designate a polygonal outline instead of a rectangle.

In the present invention, instead of designating a rectangle or polygon as an area to surround the cutout target image, the user may designate, e.g., an area such as a circle or ellipse expressed by a curved line or a closed area containing both straight lines and curved lines.

In the above-described embodiments, color area selection is made by using an RGB space. However, the present invention is not limited to this. For example, a color space such as L*a*b*, YCbCr, HSL, or HSV may also be employed. The threshold value may be set for each of the brightness and color difference. Alternatively, the threshold value itself may be set automatically and dynamically on the basis of a pixel value.

The object of the present invention is achieved by supplying a storage medium which stores program codes to implement the functions of the above-described embodiments to a system or apparatus and causing the computer of the system or apparatus to read out and execute the program codes in the storage medium.

In this case, the program codes read out from the storage medium implement the functions of the above-described embodiments by themselves, and the storage medium which stores the program codes constitutes the present invention.

The functions of the above-described embodiments are implemented even when the OS running on the computer partially or wholly executes actual processing on the basis of the instructions of the program codes.

The program codes read out from the storage medium also implement the functions of the above-described embodiments by the following steps.

(1) The program is written into the memory of a function expansion card inserted into the computer or a function expansion unit connected to the computer.

(2) The CPU of the function expansion card or function expansion unit partially or wholly executes actual processing on the basis of the instructions of the written program codes.

The program can take any form such as an object code, a program to be executed by an interpreter, or script data to be supplied to the OS as long as the computer can implement the functions of the above-described embodiments.

Examples of the storage medium to supply the program are a RAM, NV-RAM, a Floppy® disk, optical disk, magneto-optical disk, CD-ROM, MO, CD-R, and CD-RW. The storage medium can also be a DVD (DVD-ROM, DVD-RAM, DVD-RW, and DVD+RW), magnetic tape, nonvolatile memory card, or a ROM of another type if it can store the program. The program may be downloaded from another computer (not shown) or database connected to the Internet, commercial network, or local area network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-048980, filed Feb. 24, 2006, which is hereby incorporated by reference herein in its entirety.

What is claimed is:

1. An image processing method comprising:
specifying a polygonal area including a target object in an image, the specified polygonal area having plural sides;
determining one of the sides of the specified polygonal area that does not contact the target object;
determining an outline of the target object by examining a value of a pixel included in an area formed by moving the determined side in a direction away from an original position of the determined side.

2. The method according to claim 1, further comprising cropping the target object along the determined outline.

3. The method according to claim 1, wherein the specified polygonal area is designated by a user.

4. The method according to claim 1, wherein the outline of the target object is determined by examining whether a difference between a value of a target pixel and a value of a pixel examined immediately before the target pixel is larger than a predetermined threshold value.

5. An image processing apparatus comprising:
a specifying unit configured to specify a polygonal area including a target object in an image, where the specified polygonal area has plural sides;
a first determining unit configured to determine one of the sides of the specified polygonal area that does not contact the target object; and
a second determining unit configured to determine an outline of the target object by examining a value of a pixel included in an area formed by moving the determined side in a direction away from an initial position of the determined side.

6. A non-transitory computer-readable storage medium storing a computer-executable program, the computer-executable program comprising:
specifying a polygonal area including a target object in an image, the specified polygonal area having plural sides;
determining one of the sides of the specified polygonal area that does not contact the target object; and
determining an outline of the target object by examining a value of a pixel included in an area formed by moving the determined side in a direction away from an initial position of the determined side.

* * * * *